Dec. 14, 1965  D. E. VARNER  3,223,840
METHOD AND APPARATUS FOR MEASURING THE PROPERTY OF A
MAGNETIZABLE WORKPIECE USING NUCLEAR RADIATION
Filed April 27, 1961  2 Sheets-Sheet 1

INVENTOR
Donald E. Varner
ATTORNEY

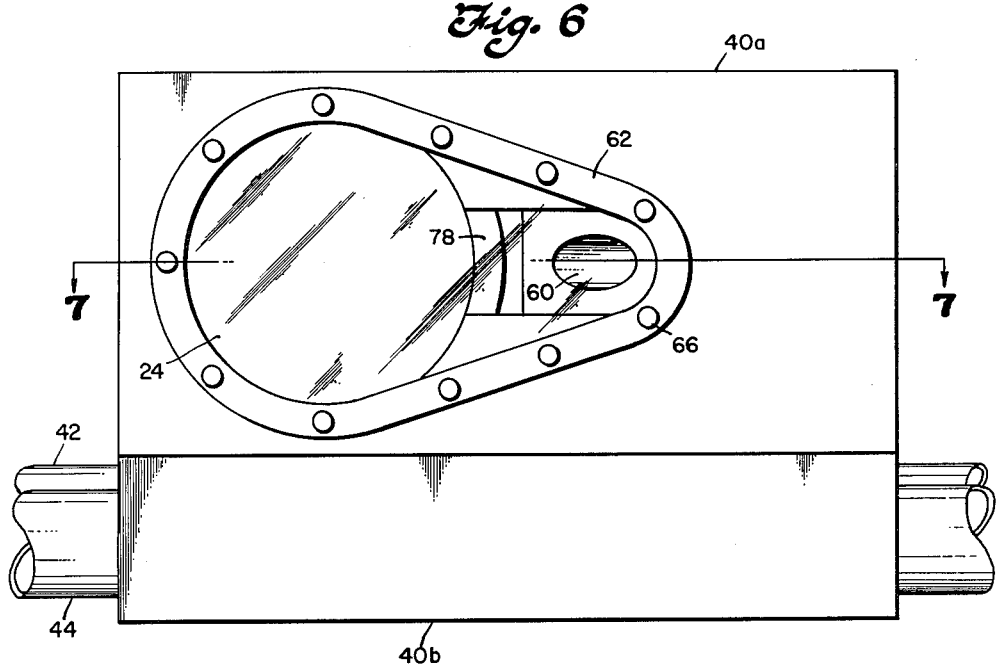
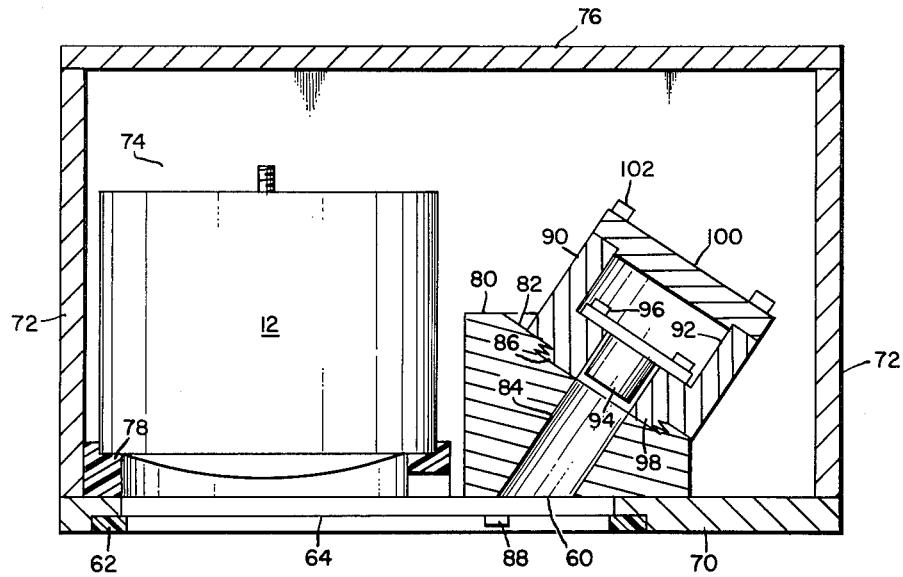

United States Patent Office 3,223,840
Patented Dec. 14, 1965

3,223,840
METHOD AND APPARATUS FOR MEASURING THE PROPERTY OF A MAGNETIZABLE WORKPIECE USING NUCLEAR RADIATION
Donald E. Varner, Columbus, Ohio, assignor to Industrial Nucleonics Corporation, a corporation of Ohio
Filed Apr. 27, 1961, Ser. No. 106,042
14 Claims. (Cl. 250—83.3)

This is a continuation-in-part of my copending application Serial No. 790,726, filed February 2, 1959, and which issued on December 8, 1964, as U.S. Patent No. 3,160,753.

This invention relates to a method and means for measuring the hardness characteristic of a metallic workpiece, and more particularly it relates to a method utilizing a novel penetrative radiation reflection technique which is uniquely adapted to provide a continuous indication of the hardness of a fast-traveling workpiece, in a non-contacting, non-destructive manner.

There are many concepts of material hardness and there are as many different ways to measure hardness. The hardness of a substance may be arbitrarily defined as its resistance to permanent deformation by a specific indenter acting under a known load. Instruments employed to determine hardness may be of the Brinell, Rockwell or the sceleroscope type. The Brinell tester utilizes a ball indenter forced against a workpiece by a given weight for a specific period of time. The diameter of impression is an indication of workpiece hardness. Brinell hardness testers are generally unsuited for rapid hardness measurements; as a result, these devices are usually confined to laboratory analyses.

The Rockwell tester provides means for measuring the penetration caused by a load of predetermined magnitude being directed toward a workpiece. The Rockwell number of hardness is read upon a suitable dial having various scales for accommodating a wide range of hardness. The sceleroscope is a device for determining the dynamic hardness of a relatively large workpiece. In the sceleroscope, a diamond-faced hammer is dropped within a cylindrical glass housing onto the workpiece. The height of rebound is proportional to the hardness of the tested material.

With each of these devices it is necessary to permanently damage or mar the surface of the workpiece in order to determine its characteristic hardness. In addition, the workpiece must usually remain stationary during the interval of measurement. Finally, inasmuch as recent advancements in industrial progress can be primarily attributed to an almost universal adoption of automated production lines, these devices cannot be used advantageously thereon.

In accordance with this invention it has been found that under special conditions, as set forth herein, an indication of hardness can be obtained from the output of a conventional penetrative radiation reflection gauge, or "backscatter" gauge, of the type commonly used to measure thickness.

It is generally known that the indication provided by such a gauge is a function not only of the thickness, but of the chemical composition of the metal, or more specifically, the composition in terms of the kinds and relative amounts of the atomic constituents thereof. However, it has now been discovered that there is a second order effect which influences said indication to a much smaller degree, and that by isolating the effect of said influence, a useful indication of hardness can be obtained.

To my knowledge, no one has previously observed or attempted to make use of the aforesaid hardness effect on a backscatter gauge, nor can it be satisfactorily accounted for by the presently known and accepted theoretical considerations, particularly in relation to the backscattering of beta rays. However, the essential conditions and the procedure for practicing the novel hardness measuring method of the present invention can be set forth briefly as follows.

It is desired, say, to obtain a continuous, non-contacting and non-destructive indication of the hardness of a fast-traveling steel strip, for example, a strip passing through a continuous cold-working operation or annealing line. The first requirement of my method is that the chemical composition of the metal be maintained substantially constant throughout the strip, and this requirement can be, and ordinarily is, adequately met by conscientious attention to the usual quality control methods. I next provide a conventional radiation reflection or backscatter gauge, preferably having means for rigidly mounting a radiation source and a radiation detector in a unitary structure which is in turn adapted to be mounted adjacent one said of the moving steel strip. The nuclear radiation source, which is preferably a beta ray source, must be selected to provide a beam of radiation having an energy characteristic such that all values of thickness of the passing strip are greater than an "infinite thickness" to the radiation, as hereinafter described and defined. Now if the surface of the traveling strip is maintained at a constant distance from the source and detector, the response of the detector will be a function of the hardness of the strip.

By a well-known procedure commonly used in the calibration of a backscatter thickness gauge, the detector response is readily correlated with the hardness of the strip. This procedure is described in detail, for example, in United States Patent No. 2,951,161. In essence, a graph is plotted relating the detector response to the hardness of samples as determined by other means, a portion of the response curve is selected as the range of values to be placed on the hardness scale provided for the gauge indicating device, and the calibration of instrument is completed by adjusting a pair of potentiometers in the measuring circuit in accordance with the ordinate and the slope of the response curve at the center of said range.

It is to be pointed out that the change in response of a beta reflection gauge to hardness variations is rather small by comparison with the response change to, say, certain composition variations. Some appreciation of the relative magnitude of the hardness effect can be had from the following example. A fully hardened steel sample is measured by the radiation gauge; the sample is then annealed in a controlled atmosphere to prevent the possibility of a composition change; open re-measuring the sample with the radiation gauge, about a two percent decrease in the detector output is noted. This may be compared with about a 30–40 percent difference in the detector response which obtains with a pure tin sample and a steel sample. Thus the radiation device operates with a comparatively low signal to noise ratio as a hardness measuring device.

Nonetheless, considering its advantages as a non-contacting, non-destructive device which is adapted to measure hardness at any line speed and independently of thickness variations, and certain other variations, the system of the invention has been found quite practicable, and even at the present early state of development thereof, produces results which compare very favorably with the present eddy current or magnetic devices sometimes used to obtain an indication of hardness. Moreover, it is a much simpler system to practice and to interpret the results obtained.

Further in accordance with this invention, it has been found that when the backscatter radiation method of hardness measurement is practiced utilizing a source of radiation comprising charged particles such as beta rays, a substantial error may be introduced if the measured material is variably magnetized. It is known that many metal treating processes, whether or not they involve the direct application of magnetic fields, result in incidental magnetization of the workpiece. This is the case, for example, with practically all cold steelworking processes such as the reduction of strip by a cold rolling mill. It is also known that traveling charged particles tend to be deflected into curved paths by a magnetic field.

While the deflection of highly energetic electrons such as beta rays in such incidental magnetic fields is expected to be slight, I have found that the effect thereof on the radiation hardness gauge is substantial. For example, using a krypton-85 source and converting the radiation detector output to a voltage of about fifteen volts in the customary manner, I have found that under certain conditions, as set forth in my copending application Serial No. 108,108, filed May 5, 1961, an applied magnetic field will increase said voltage by about one millivolt per gauss. Accordingly for best results in the practice of the hardness meaurement method, the workpiece should be demagnetized before the radiation measurement thereon is taken.

It is a primary object of the present invention to provide a method and means for non-destructively measuring the hardness of a workpiece.

It is another object of the present invention to provide method and means for continuously measuring the hardness of a rapidly moving workpiece.

It is still another object of the present invention to provide method and means for measuring the hardness of substantially larger volume of production than devices used heretofore.

It is a further object of the present invention to provide apparatus for accurately reproducibly measuring the hardness of a workpiece.

It is yet another object of the present invention to provide apparatus for measuring hardness that may be easily adapted to existing industrial production lines.

Additional advantages of the present invention will become apparent upon reference to the following detailed description taken in conjunction with the appended drawings in which:

FIG. 6 is an enlarged sectional view taken on the line 6—6 of FIG. 5;

FIG. 7 is a sectional view taken on the line 7—7 of FIG. 6, and

Figure 1:
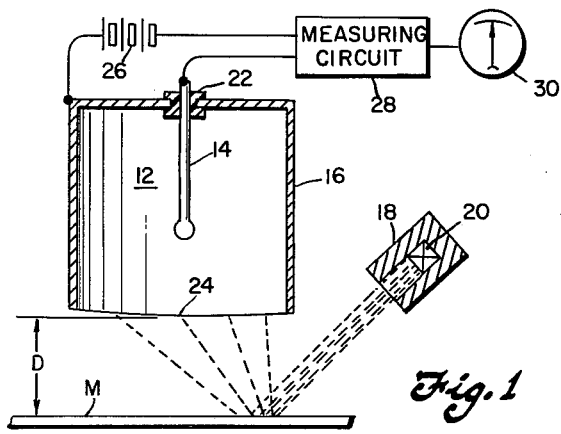
FIG. 1 is a sectional view diagrammatically illustrating elemental radiation generating and detecting components pertinent to the present invention.

With particular reference to FIG. 1, a material M is spaced a predetermined distance D from a radiation detector 12. The detector 12 may comprise an ion chamber having a probe 14 and an outer shell 16. The ionization chamber is of preferably cylindrical construction having a hole drilled in one base for accommodating the probe. A non-conducting material is utilized at 22 to insulatively secure the probe 14 to the chamber. A thin stainless steel window 24 serves to enclose the chamber whereupon a suitable inert gas may be admitted therein. A source of operating potential is supplied by a battery 26 connected to the shell 16 of the chamber. The probe 14 is coupled to a measuring circuit at 28 which preferably comprises circuitry substantially as disclosed in U.S. Patent No. 2,951,161.

Shielding as at 18 prevents direct irradiation of the chamber by an externally located nuclear radiation source 20 and further serves to direct emanations of the source 20 toward that portion of the material M which is immediately adjacent the chamber 12.

In FIG. 1, the apparatus described is responsive to "backscattered" radiation entering the chamber window 24, i.e., radiation reflected from the material M. In a well-known manner, current will flow from the shell 16 toward the probe 14 due to the ionization of the enclosed gas by reflected radiation. A meter 30 may be provided to indicate the magnitude of this chamber current flow. The amount of reflected radiation received by the chamber 12 will be proportional to the weight per unit area of the measured material M for a given source 20. This technique has heretofore been employed to determine the weight per unit area of various sheet materials such as rubber, plastic or steel. Sheet thickness may be measured if the density of the measured material M remains substantially constant.

In the steel-making industry, various schemes are employed to produce a steel having a specified hardness. Successful methods usually involve cold rolling and heat treating of the workpiece. By controlling the temperature to which the alloy is subjected and the rate of cooling, it is possible to induce varying degrees of hardness. The maximum hardness obtainable is largely dependent upon the carbon content of the original sample.

Figure 2:
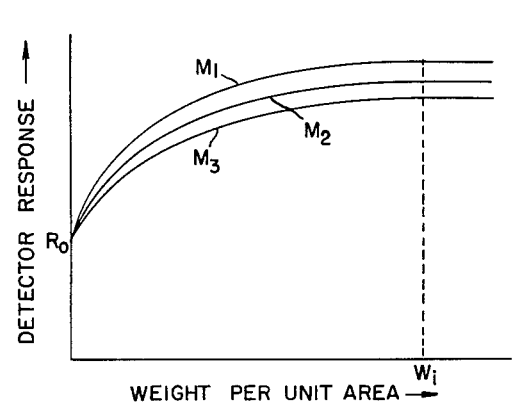
FIG. 2 is a graph of the response of the apparatus in FIG. 1 to materials of varying hardness.

If the material M is assumed to be a type of stainless steel of consistent chemical composition and samples thereof are inspected according to the reflection gauging principle set forth hereinabove, a graph of detector response vs. weight per unit area may be plotted as shown in FIG. 2. It will be noted that when there is no material M (zero thickness) presented to the chamber 12, the response is not zero but will have some value $R_o$, due to various factors such as scattered radiation or radiation reflected from air in front of the detector. As increasing thicknesses of material M are placed adjacent the source-detector unit 12, the response increases until, for some indeterminaate thickness in the vicinity of $W_1$, it reaches an asymptotic maximum beyond which additional material weight produces substantially no change in detector response. Response curves designated as $M_1$, $M_2$ and $M_3$ are representative of three stainless steel samples having dissimilar degrees of hardness; moreover, the relative hardness of each decreases with ascending numerical subscript. From this it may be seen that the radiation reflectivity characteristic of a given material is a function of its hardness. Therefore, it is possible to obtain a correlation between detector response and hardness if the thickness of the measured material M is greater than the value $W_1$. This significant quantity is referred to as an "infinite thickness" of the material M since the chamber 12 is unable to distinguish between thicknesses of material in excess of this value. Said another way, the workpiece presents a substantially infinite absorber to the radiation.

The infinite thickness of a given material is determined largely by the energy characteristics of the nuclear radiation source 20. As the thickness of the material M defines a limit below which the above described apparatus will be responsive to thickness as well as hardness variations, it is desirable to employ a nuclear source of radiation capable of producing corpuscular emissions of relatively low average energy content. A radioactive isotope such as krypton-85 may be ideally suited for this purpose. In this case, $W_1$ will assume a value approximately equal to 50 mg. per cm.$^2$. Thus, use of krypton-85 at 20 augments the utility of the present invention by enabling accurate hardness measurements of stainless steel samples having a thickness down to .004 of an inch.

Figure 3:
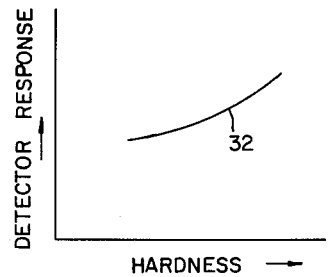
FIG. 3 is a graph of detector response vs. hardness.

In FIG. 3, data from the curves of FIG. 2 are graphically plotted at 32 to more aptly illustrate the correlation between detector response and relative hardness. The abscissas of the curve in FIG. 3 may be conveniently labeled in units of Rockwell, Brinell, etc., but for purposes of simplicity a specific designation is omitted. From the curve 32 of FIG. 3, it may be observed that the detector response increases as a function of hardness. Curve 32 may exhibit a slight curvature at large values of hardness. To provide an accurate reading of hardness, the measuring circuitry employed at 28 as well as the indicator 30 may be readily calibrated to compensate for non-linearities in the curve 32.

Figure 4:
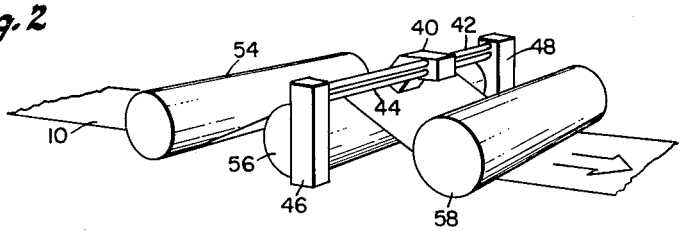
FIG. 4 is a perspective view, partly diagrammatic, of inspection apparatus for measuring the hardness of steel strip comprising a preferred embodiment of the present invention.

FIG. 4 depicts a specific embodiment of the foregoing apparatus so that the utilitarian aspects of the present invention may be more fully appreciated. Referring to FIG. 4, an angular inspection head 40 is movably supported by a pair of rails 42 and 44 over a traveling sheet of steel 10. The rails 42 and 44 are supported by a pair of upstanding stanchions 46 and 48 base-mounted at either side of the sheet 10. Inspection head 40 contains the radiation source and detector briefly described hereinabove. The inspection head 40 may be fixedly positioned at a given location or periodically traversed across the sheet 10 by a motor (not shown). Inasmuch as the mechanical expedients required to traverse the inspection head 40 across the sheet 10 will be apparent to those skilled in the art, a description thereof is herein omitted.

Since it will be recalled that it is necessary to maintain a predetermined space between the inspection head 40 and the sheet 10, a set of three rolls 54–58 are provided for this purpose. With the sheet trained over the roll 56 in the manner shown, sufficient wrap is provided to prevent flutter of the sheet 10. The possibility of a dimensional change in measuring gap is substantially avoided by maintaining tension on the sheet 10.

Figure 5:
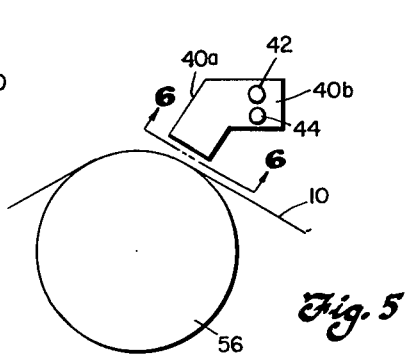
FIG. 5 is a side elevation of the apparatus in FIG. 4.

In order to illustrate certain constructional details of one type of radiation gauge which has been employed in the practice of the invention, FIGS. 5 and 6 are herein provided. Referring first to FIG. 5, the housing 40 is fabricated with a downwardly inclined source-detector unit 40a having a face disposed adjacent the traveling sheet 10. By positioning the tubular rails 42 and 44 from the roll 56, the face of the source-detector unit 40a may be arranged in spaced tangential relationship with said roll. A support section 40b adjoins the source-detector unit 40a and serves as a mounting bracket therefor. Accordingly, a description thereof is omitted from the present specification.

Now, in FIG. 6, the face of the source detector unit 40a is shown having an ovate opening exposing the chamber window 24 and a radiation exit 60. To prevent entry of foreign matter and moisture into the source-detector unit 40a, a retaining ring 62 is provided about the ovate opening to secure a membrane 64. The membrane 64 may be of the type described in U.S. Letters Patent No. 2,858,450, issued October 28, 1958, to B. C. Holben. Machine screws at 66 serve to fasten the retaining ring 62 flush against the face of the source-detector unit 40a.

A typical scheme for mounting the source and detector elements, per se, in the unit 40a is shown in FIG. 7. The source-detector unit 40a may be a rectangular metallic housing having a base 70, side wall portions 72, rear wall 74, a forward wall (not visible), and a cover 76. In order to insulatively mount the chamber 12 at one end of the unit 40a, a phenolic ring 78 is provided with an annular stepped portion adapted to receive the radiation admissive end of the chamber 12. The ring 78 may be secured by screws to the base plate 70. The chamber 12 is then bonded to the phenolic ring 78 by suitable adhesive.

At the alternate end of the base plate 70 there is provided a mounting block 80 fabricated of radiation impervious material of high specific gravity such as lead. Block 80 is machined with an inclined surface 82 having a downwardly slanted circular hole 84 bored substantially perpendicular to the surface 82. Hole 84 is drilled through the mounting block 80 to define the elliptical radiation exit 60. Capscrews as at 88 fasten the mounting block 80 to the base 70. A tapped recess 86 is provided in the inclined face 82 of the mounting block 80 about the hole 84.

A cylindrical source mounting block 90 is formed with a stepped cavity 92 extending therethrough. A source capsule 94, containing the radioactive isotope 20, is bolted at 96 to the step of the cavity 92 so as to be concentrically disposed therein. A protruding threaded portion 98 is provided on the face of the source mounting block 90 to engage the tapped recess 86. To eliminate rearward external radiation from the source capsule 94, a cover plate 100, which may also be constructed of lead, is secured to the source mounting block 90 by capscrews 102.

When the assembly is completed, the hole 84 is collinearly aligned with the source capsule 94. Radiant energy is directed through the hole 84 and toward the exit 60 by the collimation thus provided. The energy emerges from the base 70 at a predetermined angle defined by the inclination of the slanting hole 84. Inasmuch as the membrane 64 is usually constructed of an organic material, substantially no attenuation occurs in radiant energy reflected from the sheet 10 toward the detector 12.

While the description given hereinabove discloses the details of a gauge structure which has been provided for commercial hardness gauging purposes, and wherein the radiation beam is collimated so as to strike sheet at an oblique angle, it should be pointed out that the hardness effect does not appear to be dependent in any way on said angular relationship. Substantially identical results are obtained, for example, using the gauge structure shown in FIG. 7 of my copending application Serial No. 688,720, filed October 7, 1957, now United States Patent No. 2,895,888.

As has been explained hereinabove, both in the calibration of the gauge and the use thereof for measurement of a workpiece, care should be taken to demagnetize both the samples and the workpiece before the same are gauged. In the use of a conventional demagnetizer, the material should only be passed through the demagnetizing field of the machine rather than allowing the material to contact the polepieces thereof so as to minimize residual magnetism in the sample or workpiece.

Figure 8:
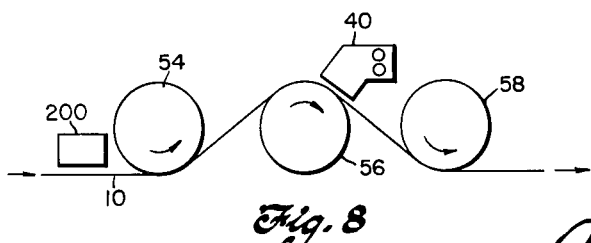
FIG. 8 is a side view of a modification of the apparatus of FIG. 4 whereby a more accurate indication of hardness is obtained by demagnetizing the strip before the same is passed through the radiation gauge.

In the case of a continuous, traveling strip which is to be gauged, the apparatus of FIG. 4 may be modified as shown in FIG. 8 by installing a demagnetizer 200 upstream of the guide roll assembly. The demagnetizer obviously should be driven by an alternating power source (not shown) of sufficiently high frequency to effect uniform demagnetization of the strip at the maximum speed thereof.

The device disclosed hereinabove is representative of only one of numerous applications utilizing a nuclear gauge for determining the hardness of a material. The described mechanical construction scheme is also quite flexible, many changes being possible therein, without detracting from the original spirit and scope of the invention as particularly defined in the following claims.

What is claimed is:

1. In the combination of a transport mechanism whereby a traveling magnetizable material of substantially constant, homogeneous composition is guided along a fixed path with a nuclear radiation reflection gauge mounted alongside said path for continuously measuring a property of said material, the improvement of means for obtaining a continuous indication of the hardness characteristic of said material, which comprises a source of nuclear radiation mounted in said gauge and having an energy characteristic such that said material presents an infinite absorber to said radiation, an indicator calibrated in hardness units for registering the response of said gauge, and means mounted alongside said path and upstream of said gauge for continuously demagnetizing said material before the same passes said gauge.

2. The method of measuring the hardness of a magnetizable workpiece having substantially constant homogenous composition, which comprises directing into a surface of said workpiece a beam of beta radiation having an energy characteristic such that said workpiece presents an infinite thickness to said beam, detecting the reflected radiation returned backwardly from said surface to provide an electrical signal proportional to the intensity of said reflected radiation, and indicating the hardness of said workpiece as a function of said signal, the improvement comprising the preliminary step of demagnetizing said workpiece immediately before performing the above-mentioned steps.

3. The method, as described in claim 2, wherein said workpiece is subjected to a demagnetizing magnetic field.

4. The method of utilizing a nuclear radiation reflection gauge to obtain a useful indication of the unknown hardness characteristic of a traveling magnetizable workpiece having substantially constant homogenous composition, which comprises mounting in said gauge a source of nuclear radiation having an energy characteristic such that said workpiece presents an infinite thickness to said radiation, calibrating said gauge so that when specimens of demagnetized material having said composition are measured thereby, the reading of said gauge is in substantial agreement with the hardness of said specimens as determined by other means, demagnetizing said workpiece before measuring said workpiece with said gauge, and thereafter measuring said traveling workpiece with said gauge whereby the hardness of said workpiece is continuously indicated.

5. The method, as described in claim 4, wherein said workpiece is subjected to a demagnetizing magnetic field.

6. The method of utilizing a nuclear radiation reflection gauge to obtain a useful indication of the unknown hardness characteristic of a traveling magnetizable workpiece having substantially constant, homogenous composition, which comprises mounting in said gauge a source of nuclear radiation having an energy characteristic such that said workpiece presents an infinite thickness to said radiation, mounting said gauge alongside the path of travel of said workpiece, constraining said workpiece following said path to a fixed distance from said gauge, demagnetizing said workpiece prior to passing said gauge, and continuously indicating the hardness of said workpiece as a function of the reading of said gauge.

7. The method, as described in claim 6, wherein, said workpiece is subjected to a demagnetizing magnetic field.

8. A method of improving the repeatability of property measurement of a magnetizable workpiece using nuclear radiation, which comprises the steps of,
   subjecting said workpiece to a magnetic field to demagnetize said workpiece prior to measuring said property, and
   measuring said work piece property.

9. The method of measuring a property of a magnetizable workpiece using nuclear radiation, which comprises the steps of,
   demagnetizing said workpiece,
   directing into a surface of said workpiece a beam of nuclear radiation,
   detecting radiation from the workpiece to provide an electrical signal that is a function of the intensity, and indicating the property of said workpiece as a function of said signal.

10. In combination of a transport mechanism whereby a traveling magnetizable material is guided along a fixed path with a nuclear radiation gauge mounted along-side said path for continuously measuring a property of the material, means mounted along-side said path and upstream of said gauge for continuously demagnetizing the material before the same passes said gauge.

11. The apparatus, as described in claim 10, wherein said demagnetizing means produces a magnetic field for reducing the residual magnetic field in the material to substantially zero.

12. The method, as described in claim 8, wherein said nuclear radiation is beta radiation.

13. The method, as described in claim 9, wherein said nuclear radiation is beta radiation.

14. The apparatus, as described in claim 10, wherein said nuclear radiation is beta radiation.

References Cited by the Examiner
UNITED STATES PATENTS

| | | | |
|---|---|---|---|
| 2,403,424 | 7/1946 | Zuschlag | 317—157.5 |
| 2,793,345 | 5/1957 | Hags | 250—83.3 X |
| 2,938,124 | 5/1960 | Boyd | 250—83.3 |
| 2,939,012 | 5/1960 | Scherbatskoy | 250—83.3 X |

RALPH G. NILSON, *Primary Examiner.*

G. R. OFELT, ARCHIE R. BORCHELT, *Examiners.*